(12) United States Patent
Schreck

(10) Patent No.: US 7,561,367 B2
(45) Date of Patent: Jul. 14, 2009

(54) BI-DIRECTIONAL DEBRIS SWEEPING PROFILE

(75) Inventor: Erhard Schreck, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/855,489

(22) Filed: Sep. 14, 2007

(65) Prior Publication Data
US 2009/0073605 A1 Mar. 19, 2009

(51) Int. Cl.
G11B 21/02 (2006.01)
G11B 5/596 (2006.01)

(52) U.S. Cl. ............. 360/75; 360/74.1; 360/78.08
(58) Field of Classification Search .......... None
See application file for complete search history.

(56) References Cited

U.S. PATENT DOCUMENTS

| | | | |
|---|---|---|---|
| 4,384,311 A | 5/1983 | McNeil | |
| 4,490,766 A * | 12/1984 | Hill et al. | 360/137 |
| 4,510,541 A * | 4/1985 | Sasamoto | 360/97.02 |
| 5,351,156 A | 9/1994 | Gregory et al. | |
| 5,424,884 A * | 6/1995 | Nonaka | 360/74.1 |
| 5,461,521 A * | 10/1995 | Ito et al. | 360/75 |
| 5,612,830 A * | 3/1997 | Gregory et al. | 360/69 |
| 6,175,473 B1 | 1/2001 | Noguchi | |
| 6,687,077 B1 * | 2/2004 | French et al. | 360/73.03 |
| 6,707,634 B2 * | 3/2004 | Kagami et al. | 360/75 |
| 7,298,572 B2 * | 11/2007 | Forehand | 360/75 |

* cited by examiner

Primary Examiner—K. Wong
(74) Attorney, Agent, or Firm—Fellers, Snider, et al.

(57) ABSTRACT

A bidirectional disc sweep routine accelerates the transducer in a storage device from a first predefined radius toward the inner radius to a second predefined radius, and accelerates the transducer from a third predefined radius toward the outer radius to a fourth predefined radius.

20 Claims, 7 Drawing Sheets

BI-DIRECTIONAL DEBRIS SWEEPING PROFILE

BACKGROUND

Embodiments of the present invention relate generally to the field of data storage devices, and more particularly but without limitation to debris remediation via controlled movements of a sweeping member.

Data storage devices are used in various applications to store data to and retrieve data from a storage medium. The storage medium is disposed in a data transfer relationship with a transducer within an enclosure. The medium is moved relative to the transducer in order to hydrodynamically support the transducer in a spatial disposition a desired distance away from the storage medium surface.

Manufacturers employ extensive measures to keep debris, such as contaminants and particulates, out of the enclosure and particularly away from the space between the storage medium surface and the transducer. For example, manufacturing operations prior to sealing the enclosure are performed in clean room environments. Even so, debris can exist in the enclosure as a remnant of the manufacturing process before sealing the enclosure, or it can be created within the sealed enclosure during operation of the storage device. Thus, it is not unusual for the manufacturer to place a recirculation filter in the enclosure to entrap fluid-borne debris.

The claimed embodiments are directed to sweeping debris away from locations where it migrates near to or onto the data storage medium, so that the debris is more likely to be entrapped by the recirculation filter and less likely to interfere with the fly-height spacing between the transducer and the data storage medium.

SUMMARY

The claimed embodiments contemplate remediating debris in a data storage device by employing a bi-directional sweep profile.

In some embodiments a method is provided that includes rotating a data storage disc to support the transducer at a fly height adjacent the disc. The method also includes accelerating the transducer from a first predefined radius toward the inner radius to a second predefined radius, and accelerating the transducer from a third predefined radius toward the outer radius to a fourth predefined radius.

In some embodiments a controller is provided performing a bidirectional sweep routine of the transducer across a storage medium to remove debris from the medium.

In some embodiments a data storage device is provided having the transducer operably disposed in a data transfer relationship with the storage medium, and means for removing debris from the medium by simultaneously executing I/O commands and an idempotent sweep routine with the transducer.

DETAILED DESCRIPTION

Figure 1:
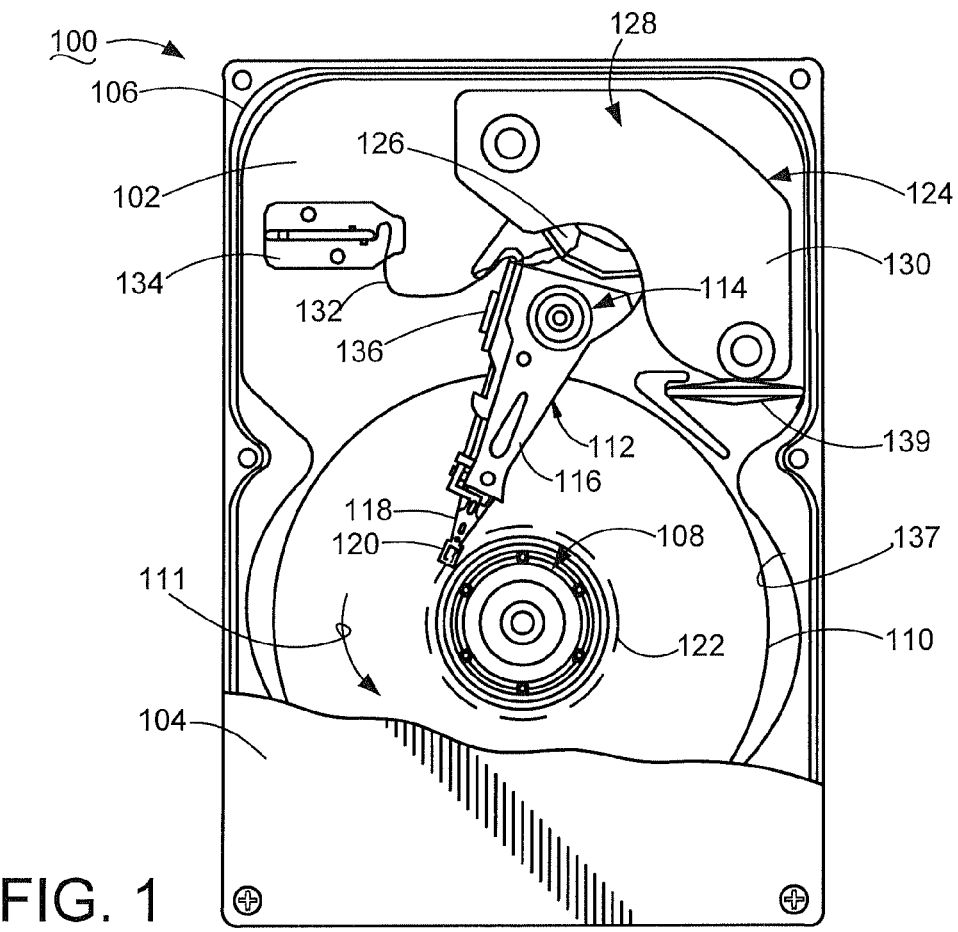
FIG. 1 depicts a plan view of a data storage device that is constructed in accordance with embodiments of the present invention.

Referring to the drawings as a whole, and for now in particular to FIG. 1 which is a plan view of a data storage device 100 that is constructed in accordance with embodiments of the present invention. A base 102 and a cover 104 (partially cutaway) with a sealing member 106 interposed therebetween provide a sealed enclosure for a number of components. These components include a spindle motor 108 that is fixed in rotation with one or more data storage mediums (sometimes referred to as "discs") 110 in a direction denoted by 111.

Adjacent the disc 110 is an actuator assembly 112 that pivots around a bearing assembly 114. The actuator assembly 112 includes an actuator arm 116 supporting a load arm 118 that, in turn, supports a read/write transducer (or "head") 120 in a data transfer relationship with the adjacent disc 110.

A recording surface of the disc 110 is divided into a plurality of tracks 122 over which the head 120 is moved. FIG. 1 illustrates only one concentric track 122, but in alternative equivalent embodiments the tracks can be non-concentric, such as spiral-shaped tracks. The tracks 122 can have head position control information written to embedded servo sectors. Between the embedded servo sectors are data sectors for storing user data. The head 120 stores input data to the tracks 122 and retrieves output data from the tracks 122. The output data can be previously stored user data or it can be servo data used to position-control the head 120 relative to a desired track 122.

The actuator assembly 112 is positionally controlled by a voice coil motor (VCM) 124 that includes an actuator coil 126 immersed in a magnetic field generated by a magnet assembly 128. A pair of steel plates 130 (pole pieces) mounted above and below the actuator coil 126 provides a magnetically permeable flux path for a magnetic circuit of the VCM 124. During operation of the data storage device 100 current is passed through the actuator coil 126 forming an electromagnetic field, which interacts with the magnetic circuit of the VCM 124, causing the actuator 112 to move the head 120 radially across the disc 110.

To provide the requisite electrical conduction paths between the head 120 and data storage device control circuitry, head wires of the head 120 are affixed to a flex circuit 132. The flex circuit 132 is routed at one end from the load arms 118 along the actuator arms 116, and is secured to a flex connector 134 at the other end. The flex connector 134 supports the flex circuit 132 where it passes through the base 102 and into electrical communication with a printed circuit board assembly (PCBA, not shown), which can be mounted to the underside of the base 102. A preamplifier/driver (preamp) 136 conditions read/write signals passed between the control circuitry and the head 120.

The disc 110 spins with its outer edge in a close mating relationship with an arcuate surface defined by a shroud 137 that constrains the outwardly spiraling fluid currents generated by the spinning disc 110. However, an abrupt opening in the shroud 137 creates a localized low pressure area through which a portion of the outwardly spiraling currents flow to the VCM 124 for cooling purposes. In the path of that fluid stream is a recirculating filter 139 that entraps fluid-borne debris.

Figure 2:
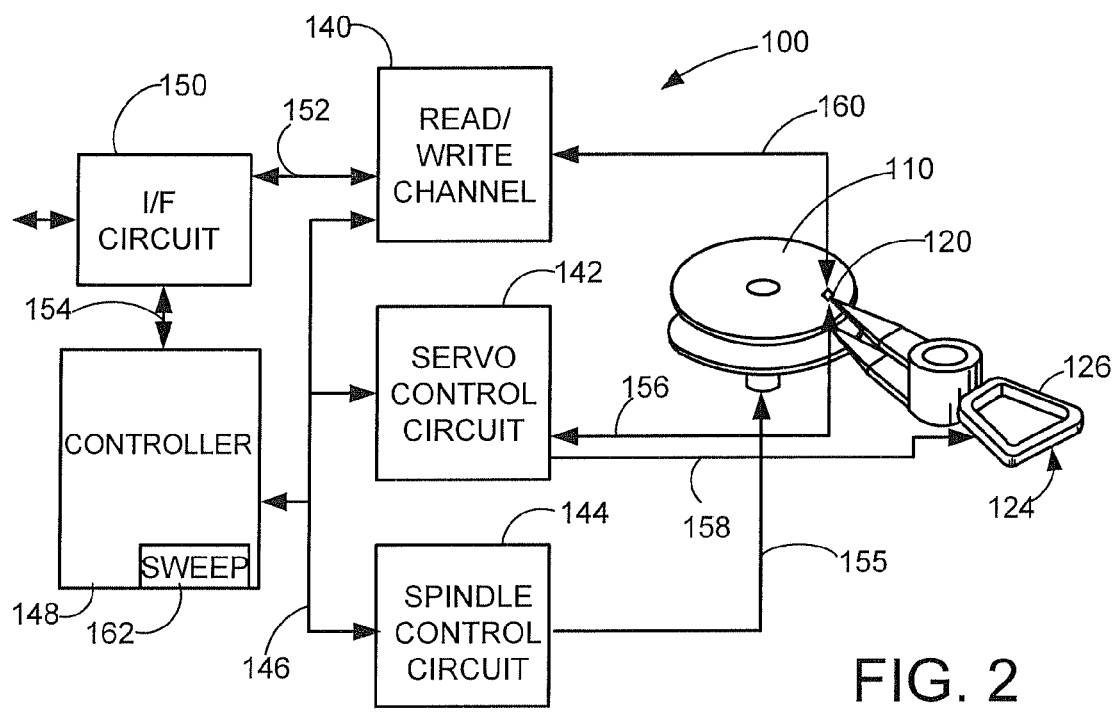
FIG. 2 is a functional block diagram of the data storage device of FIG. 1.

FIG. 2 is a functional block diagram of the data storage device 100 generally comprising a read/write channel 140, a servo control circuit 142, and a spindle control circuit 144, all connected by a control bus 146 to a system controller 148. An interface circuit 150 is connected to the read/write channel 140 by bus 152 and to the system controller 148 by bus 154. The interface circuit 150 serves as a communications interface between the data storage device 100 and a host or network server.

The spindle control circuit 144 controls the rotational speed of the motor 108, and thus the disc 110, via signal path 155. The servo control circuit 142 receives servo position information from the head 120 via signal path 156 and, in response thereto, provides a correction signal via signal path 158 to the actuator coil 126 in order to position the heads 120 with respect to the disc 110. The read/write channel 140 passes data to be stored to and retrieved from the disc 110, respectively, via signal path 160 and the head 120.

Generally, in response to a write command from a host or other network server (not shown) and received by the system controller 148 via the interface 150, the controller 148 controls the flow of data to be written to the disc 110. The read/write channel 140, in turn, provides a write current to the head 120 in order to store the data by selectively magnetizing selected data tracks on the disc 110. Alternatively, in response to a retrieve command from the host via the interface 150, the head 120 detects flux transitions from the selected data tracks 122 on the disc 110 and provides an analog read signal to the read/write channel 140, which in turn converts the analog read signal to digital form and performs the necessary decoding operations to provide data to the interface circuit 150 for output to the host. In controlling these operations of the data storage device 100, the system controller 148 employs the use of programming instructions stored in memory.

One set of those programming instructions is denoted as a sweep routine 162 for performing an adaptive bidirectional sweep of the head 120 across the disc 110 to remove debris from the disc 110. As discussed below, the sweep routine 162 adaptively accelerates the head 120 between predetermined radial start and stop positions in each of opposite radial directions in order to minimize the cycle time of the sweep routine 162. The start positions in each direction are selected in relation to the magnitude of respective sidewall projections of the head 120 onto the disc 110, which vary in relation to the extent to which the head 120 is skewed to a respective track at a radial location.

Preferably, the controller 148 schedules the sweep routine 162 to operate as a background operation so as to not diminish the input/output (I/O) command performance of the storage device 100. However, if sufficient idle system processor time is not available for off-load sweeping, then the controller 148 can schedule the sweep routine 162, either in part or in whole, as a constituent in a seek command that it issues to the head 120 during I/O command processing. If, as a result, the sweep routine 162 is executed piecemeal, or if it is interrupted for I/O processing, then preferably it is subsequently resumed idempotently.

Figure 3:
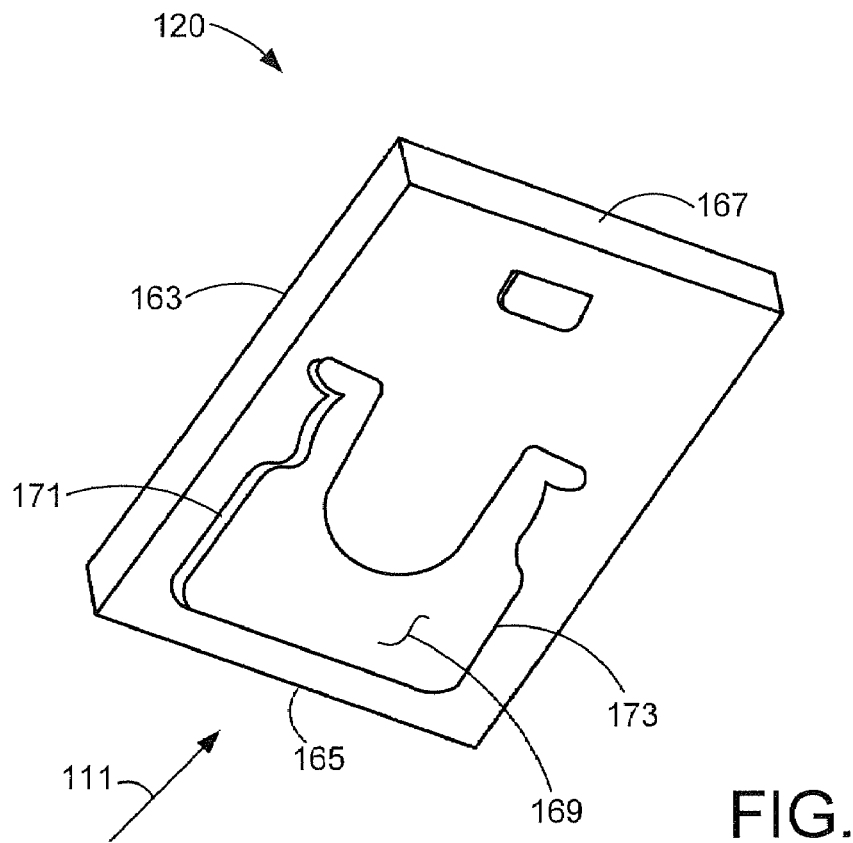
FIG. 3 is an isometric depiction of the transducer in the data storage device of FIG. 1.

FIG. 3 is an isometric view of the head 120 depicting a slider 163 having a leading end 165 and a trailing end 167 with respect to the direction of the disc rotation 111 (also see FIG. 1). The slider 163 supports an air bearing surface ("ABS") 169 that is configured to fly the slider 163 a desired distance from the disc 110 in response to being impacted by the fluid currents generated by the moving disc 110. The ABS 169 defines opposing sidewalls 171, 173 that are used during the sweep routine 162 to sweep debris from the disc 110.

Figure 4:
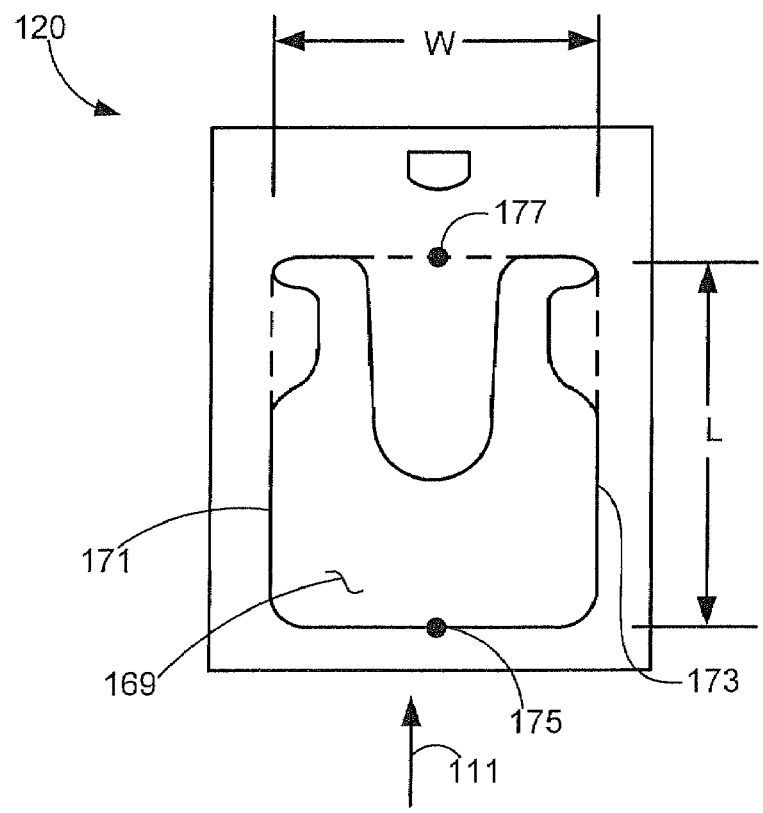
FIG. 4 is a plan view of the transducer of FIG. 3.

FIG. 4 is a plan view of the slider 163 showing a rectangular reference having a length "L" set by the sidewall 171, 173 effective length and having a width "W" set by the ABS 169 effective width. A leading edge ("LE") reference point 175 and a trailing edge ("TE") reference point 177 are defined at the respective midpoints of the opposing widths of this rectangular reference. The configuration of the ABS 169, or its effective sidewall length and width in this illustrative example, thus defines these two reference points LE 175 and TE 177 that are used to adaptively derive a velocity profile for sweeping the head 120 across the disc 110 as efficiently as possible.

Figure 5:
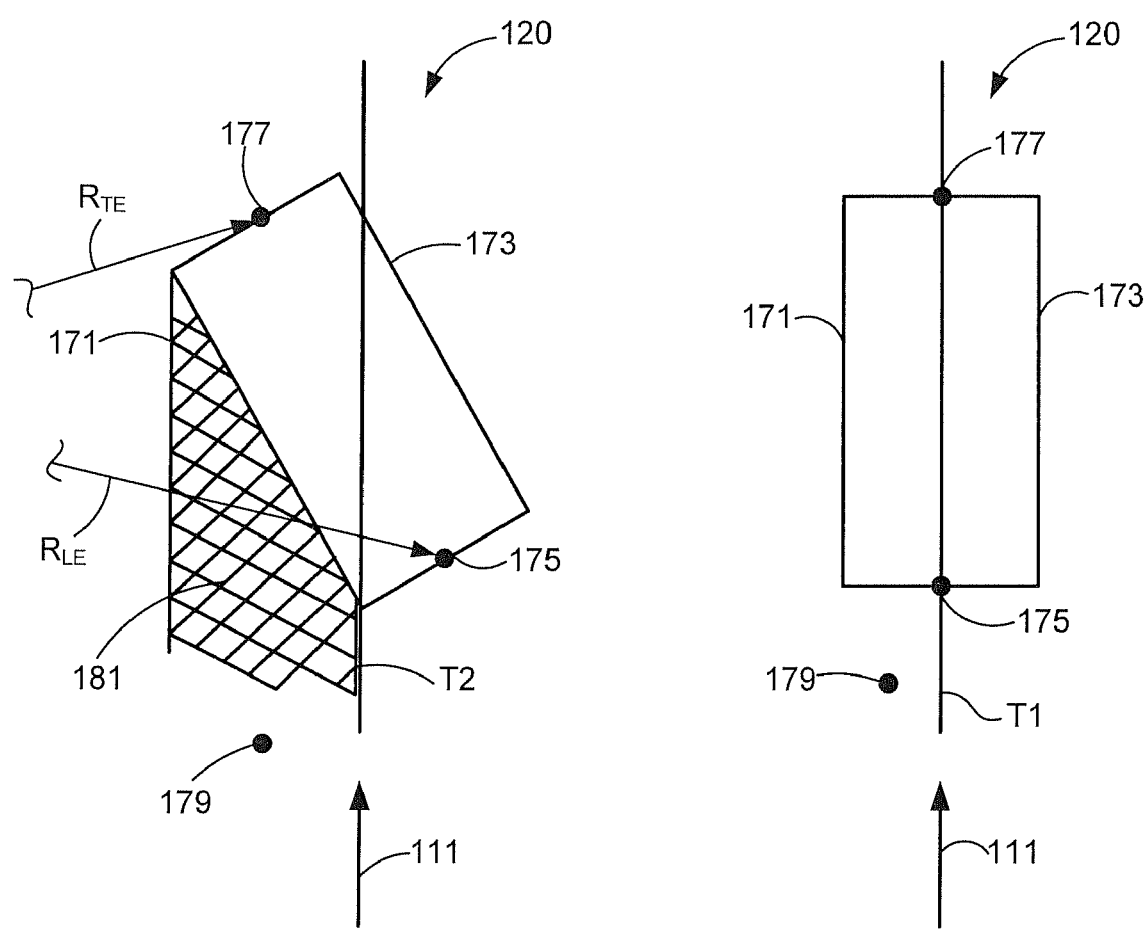
FIG. 5 diagrammatically depicts the transducer at the MD track and at another track radially inward of the MD track.

FIG. 5 diagrammatically depicts the ABS 169 rectangular reference at different times when it is aligned by the pivoting actuator 112 into a data transfer relationship with each of a first track T1 and a second track T2. The LE 175 and TE 177 are aligned with the track T1, meaning there is no skew between the head 120 and track T1. This zero skew position is referred to herein as the middle diameter "MD" track position. Note that at the MD track, and likewise at radial positions near the MD track, a debris particle 179 on the disc 110 that encounters the head 120 is more likely to be overrun by the head 120, which can cause damaging effects to the recording medium on the disc 110 and/or to the head 120.

The skew becomes progressively greater as the head 120 is pivoted away from the MD track toward the inner diameter "ID" of the disc 110. At track T2 the skewed disposition of the sidewall 171 projection onto the oncoming disc 110 defines a sweep area 181. The debris particle 179 in the path of this sweep area 181 will be impacted by the sidewall 171 and thereby removed from the disc 110 without the head 120 overrunning it. If the head 120 velocity is sufficiently high the impact will cause the particle 179 to become fluid-borne, making it more likely that it will be carried by the outwardly spiraling fluid currents to become entrapped in the recirculating filter 139 (FIG. 1). Although not depicted, it will be understood that pivoting the head 120 away from the MD track toward the outer diameter "OD" of the disc 110 likewise creates a progressively wider sweep area similarly defined by the sidewall 173 projection onto the oncoming disc 110.

In either skewed direction, the size of the sweep area increases as the head 120 is moved away from the MD track. The maximum radial velocity of the head 120 for effective sweeping is limited by the size of the sidewall projection at a particular skew angle. That is, the radial displacement of the head 120 during one complete revolution of the disc 110 is preferably less than the width of the sidewall projection at that particular radial location. If the head 120 radial displacement during a disc 110 revolution exceeds the sidewall projection width, then the sweep area 181 can miss a particle on the disc 120 and it can instead be overrun by the head 120 as it trails the sweep area.

However, as discussed above, the width of the sidewall projection is directly proportional to the radial skew. Thus, the head 120 can be moved at a relatively greater velocity at the radial locations nearer the ID and OD tracks as compared to the radial locations closer to the MD track. The claimed embodiments maximize the instantaneous sweeping velocity according to the respective size of the sidewall projection. An adaptive velocity profile is derived, as discussed further below.

Figure 6:
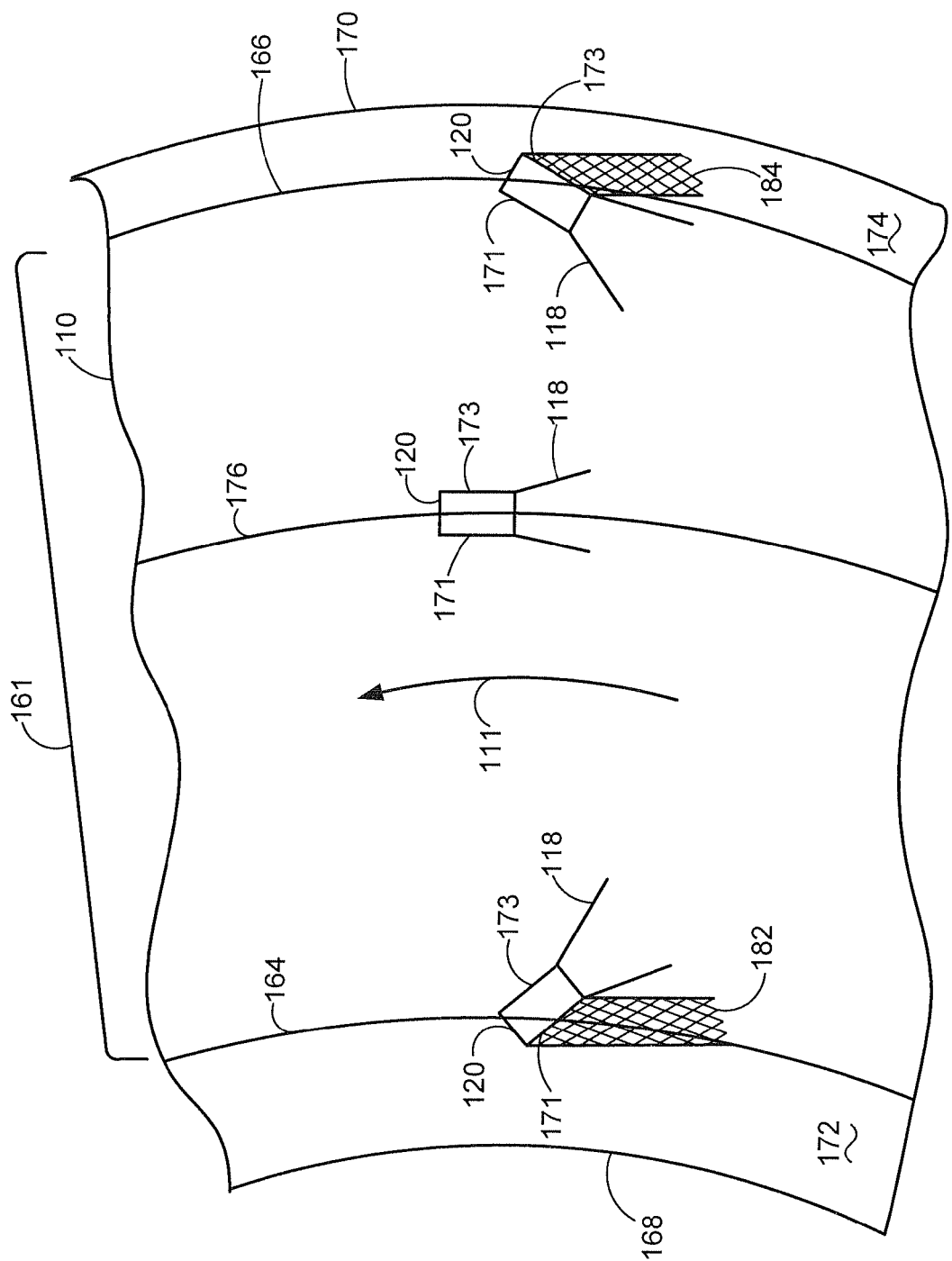
FIG. 6 is an enlarged diagrammatic depiction of a portion of the medium in the storage device of FIG. 1.

FIG. 6 is an enlarged view of a portion of the disc 110 and diagrammatically depicts a data storage space 161 defined by a plurality of data storage tracks bounded by an innermost track 164 disposed at an inner radius of the disc 110 and an outermost track 166 disposed at an outer radius of the disc 110. Note that the innermost and outermost tracks 164, 166 are spaced away from the respective edges 168, 170 of the disc 110.

FIG. 6 also diagrammatically depicts the actuator 112 having pivotally rotated the head 120 to an operable data transfer relationship with each of the innermost track 164, the outermost track 166, and the MD track 176. Again, the ND track 176 is the radial location whereat opposing sidewalls 171, 173 of the ABS 169 are disposed substantially in alignment with a tangential reference (not depicted) to the MD track 176. Because the head 120 is longitudinally aligned with the MD track 176 it is referred to as the radial location of head "zero skew." As the head 120 is moved radially inward it becomes progressively more positively skewed with respect to the tracks, and conversely as it is moved radially outward it becomes more negatively skewed with respect to the tracks.

At the innermost track 164 the projection of the sidewall 171 onto the disc 110 opposite the direction of rotation 111 creates a sweep zone 182. Similarly, at the outermost track 166 the projection of the opposing sidewall 173 onto the disc 110 in a direction opposite the disc rotation 111 creates another sweep zone 184. These sweep zones are used advantageously in the present embodiments by the bidirectional sweep routine 162 to sweep debris away from the data storage space 161. The debris, which can be contaminants or particulates, can be fluid-borne in the outwardly spiraling fluid currents or can reside on the disc 110 itself. By sweeping the disc 110 in accordance with the present embodiments, the debris is removed from the data storage area 161, where it can damage the head 120 and/or the disc 110, and injected into the fluid currents that migrate toward the recirculating filter 139 (FIG. 1) where the debris is entrapped and thus prevented from reentering the data storage space 161.

As discussed, sweeping in the medial region surrounding the MD track 176 can be counterproductive. Because the sidewall 171, 173 projections in that band are nonexistent or negligible, virtually no sweeping action is generated. Thus, sweeping in that band makes it more likely that the head 120 can overrun any existing debris, which will then likely encroach the fly-height gap between the head 120 and the disc 110.

Figure 7:
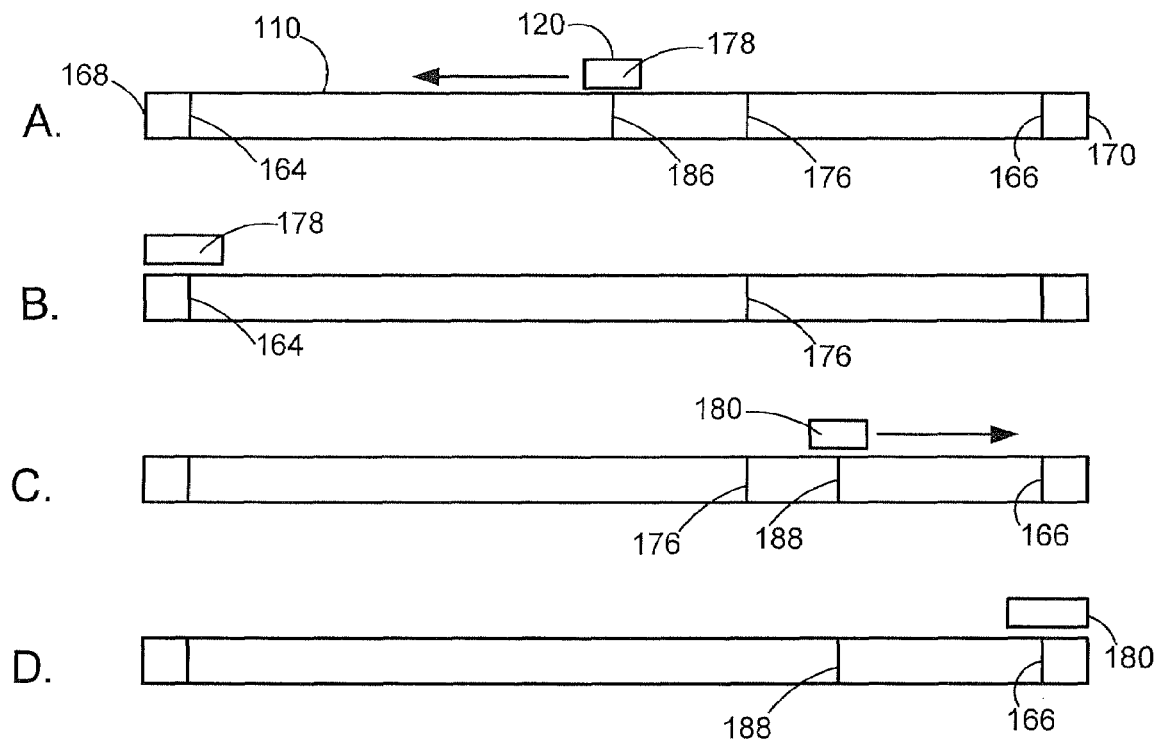
FIG. 7 diagrammatically depicts the steps and graphically depicts the velocity profile used in moving the transducer in accordance with the bidirectional sweep routine of the present embodiments.
Figure 7:
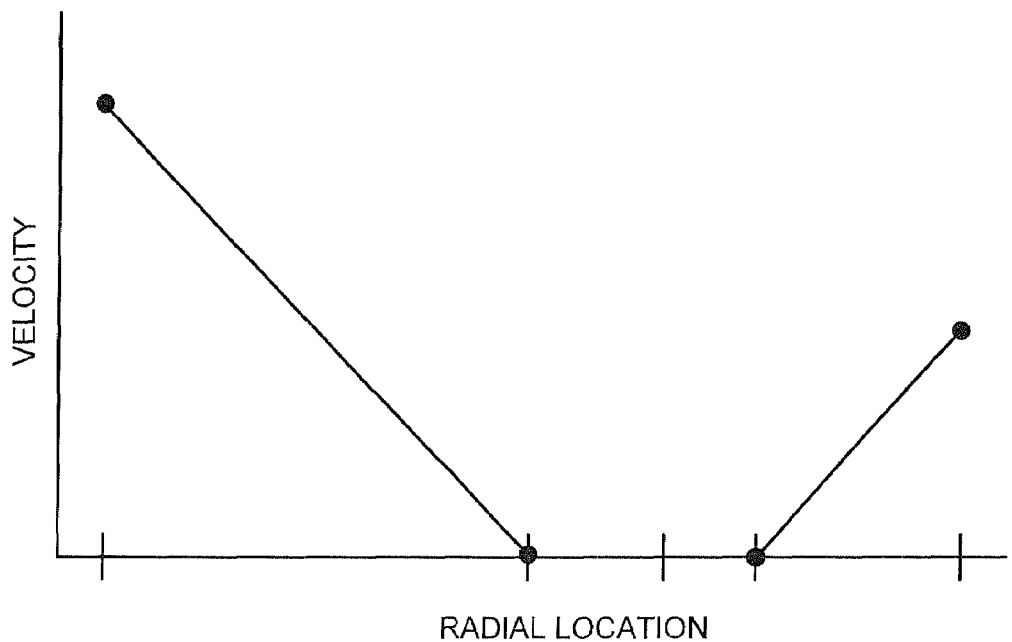

FIG. 7 diagrammatically and graphically depicts illustrative embodiments contemplating the bidirectional disc sweep routine 162 in accordance with the claimed embodiments. First, in step A the head 120 is accelerated from a first predefined radius, designated as track 186, toward the ID to a second predefined radius. Step B depicts the second predefined radius as being the innermost track 164, but the present embodiments are not so limited. In step C the transducer 120 is accelerated from a third predefined radius, designated as track 188, toward the OD to a fourth predefined radius. Step D depicts the fourth predefined radius to be the outermost track 166, but the present embodiments are not so limited.

Thus, the first and third tracks 186, 188 define boundaries of an annular zone, including the MD track 176, which is excluded from the bidirectional sweep routine 162. The first and third tracks 186, 188 can be selected in relation to the desired magnitude of the initial sidewall 171, 173 projections with which to begin the inward and outward sweeping segments. During experimentation it was determined that about a 0.5 mm offset from the MD track in both directions, or an annular zone of about 1 mm, provided enough of an initial sidewall projection for a reasonable starting velocity of the transducer. With a track density of about 160,000 tracks per inch ("TPI"), this minimum annular zone excluded by the bidirectional sweep routine 162 therefore encompassed about 5,000 tracks.

In alternative equivalent embodiments the first and third tracks can be determined in relation to a desired maximum cycle time for the bidirectional sweep routine 162. That is, the starting velocity increases and the total cycle time decreases in relation to the size of the annular zone of tracks excluded from those being swept. For example, during experimentation a threshold cycle time was achieved with 95 mm discs by setting the first and third radial boundaries at about 29 mm and 35 mm. At the 160 k TPI that excluded about 38,000 tracks from being swept.

In yet other equivalent alternative embodiments the actual data storage area being swept might govern the determination of the first and third tracks of the sweep routine 162. Especially in a situation where an indication that debris exists, it might become more important that a large percentage of the tracks be swept as opposed to minimizing the cycle time for performing a sweep.

FIG. 7 also depicts how the velocity of the head 120 is increased during the bidirectional sweep routine 162, in relation to the progressively wider sweep zones. In the embodiments of FIG. 7 the straight-line velocity profiles indicate that the head 120 velocity profile is varied at a constant rate of acceleration. In alternative equivalent embodiments a variable velocity profile can be employed. It will be noted that the ultimate outward velocity is less than the ultimate inward velocity because in the illustrative embodiments the first track 186 is farther from the second track 164 than the third track 176 is from the fourth track 166.

Preferably, the velocity profiles for the inwardly directed sweep (from track 186 to track 164) and for the outwardly directed sweep (from track 176 to track 166) move the head 120 as fast as the respective size of the sweep zone permits, as discussed above. The maximum instantaneous head 120 velocity can be derived in terms of the following relationship:

$$V = \frac{R_{TE} - R_{LE}}{\omega}$$

where:
  $R_{TE}$ is the radial location of TE 177 (FIG. 5)
  $R_{LE}$ is the radial location of LE 175 (FIG. 5)
  $\omega$ is the rotational velocity of the disc 110

By "radial location" it is meant the radius on the disc 110 at which TE and LE are located. This means that at the MD track 176 $R_{TE}$ is equivalent to $R_{LE}$, and thus the derivation for velocity at the MD track 176 becomes indeterminate.

A velocity profile for each segment of the sweep routine can be derived in terms of velocity and radius. For a constant acceleration the velocity profile can be expressed in linear form:

$$y = mx + b$$

For example, the slope of the linear velocity profile for the inwardly directed sweep segment depicted in FIG. 4 from track 186 to track 164 can be derived as the following:

$$m = \frac{V_{186} - V_{164}}{R_{186} - R_{184}}$$

The y-intercept of the linear velocity profile in this case can be derived as the following:

$$b = \left(\frac{V_{186} - V_{164}}{R_{186} - R_{164}}\right) R_{164} + V_{164}$$

Note that all velocities are determined with respect to the disc 110 rotational velocity. That permits the sweep routine 162 to be adaptively called for during motor 108 (FIG. 1) startup, before it reaches steady-state speed. Instantaneous velocities can be adaptively derived with respect to instantaneous rotational motor speed during the startup.

The most efficient dynamic velocity profile will calculate a new radial velocity of the transducer at each track. However, preferably the velocity will be changed at each of a plurality of predefined zones of tracks. For example, the velocity can be calculated for a first track that the head 120 encounters in a predetermined zone of tracks, and then held at that constant velocity as the head 120 sweeps across that zone. The number of tracks defined in the zone will depend on an acceptable margin from the most efficient dynamic velocity profile.

Figure 8:
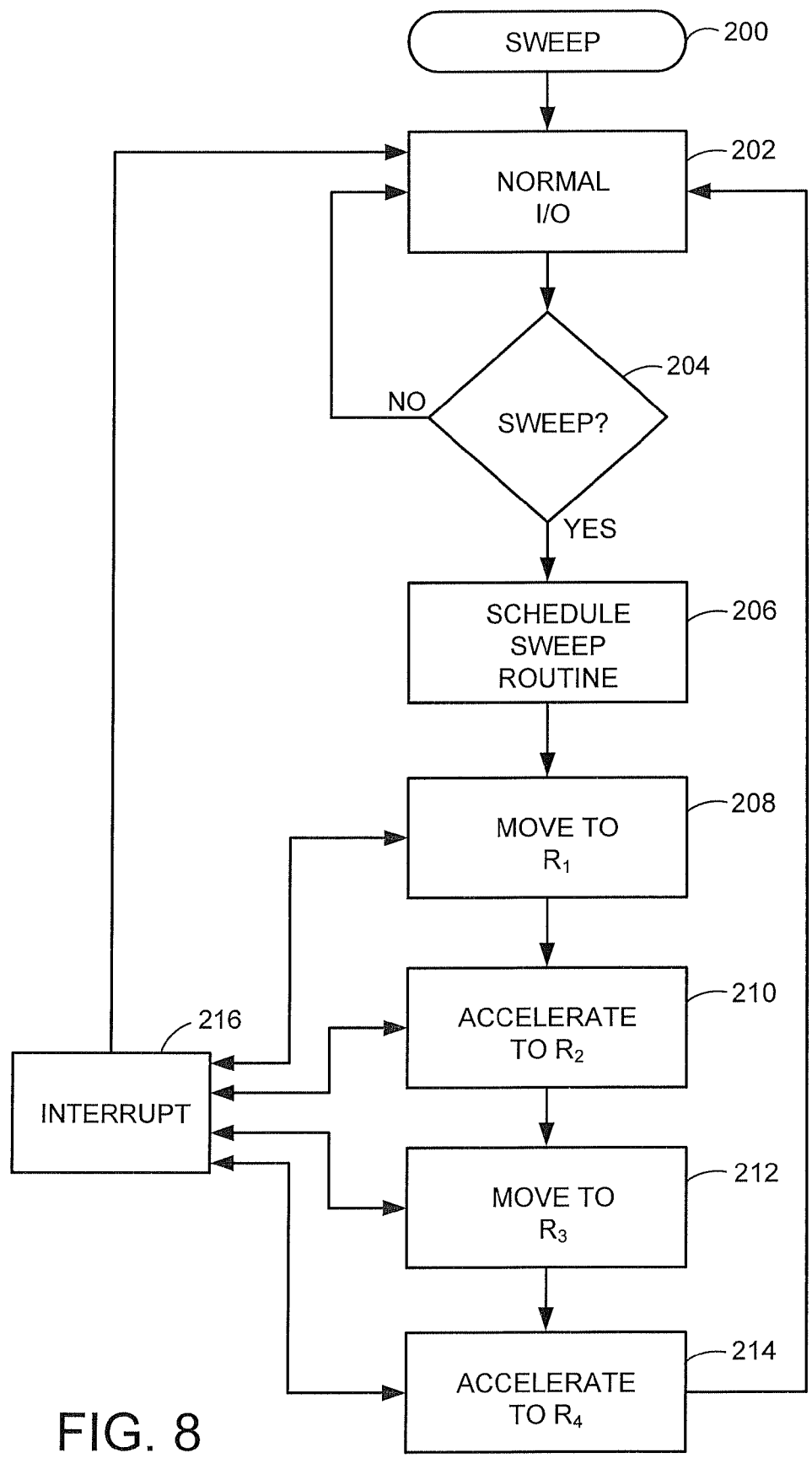
FIG. 8 is a flow chart depicting steps in a SWEEP method in accordance with embodiments of the present invention.

FIG. 8 is a flowchart depicting steps in a SWEEP method 200 that can be performed by the controller 148 (FIG. 2) executing the sweep routine 162 in accordance with the claimed embodiments. The method 200 can be called for during normal I/O operations represented by block 202. In block 204 it is determined whether the controller 148 has instigated a call for the sweep routine 162. Such a call might be scheduled at predetermined intervals, or might be called for adaptively in response to monitored parameters that predict the existence of debris such as I/O error rate and the like.

If the determination of block 204 is yes, then control passes to block 206 where the controller 148 schedules the sweep routine. Preferably, when sufficient idle system processor time is likely to exist then the controller 148 can schedule the sweep routine as a background function. For example, the controller 148 might schedule it to occur just before or while reducing power to the drive 100 when switching from an active mode to an idle, standby, or sleep mode. Conversely, the controller 148 might be able to schedule it to occur during the next startup as part of an initialization sequence.

Figure 9:
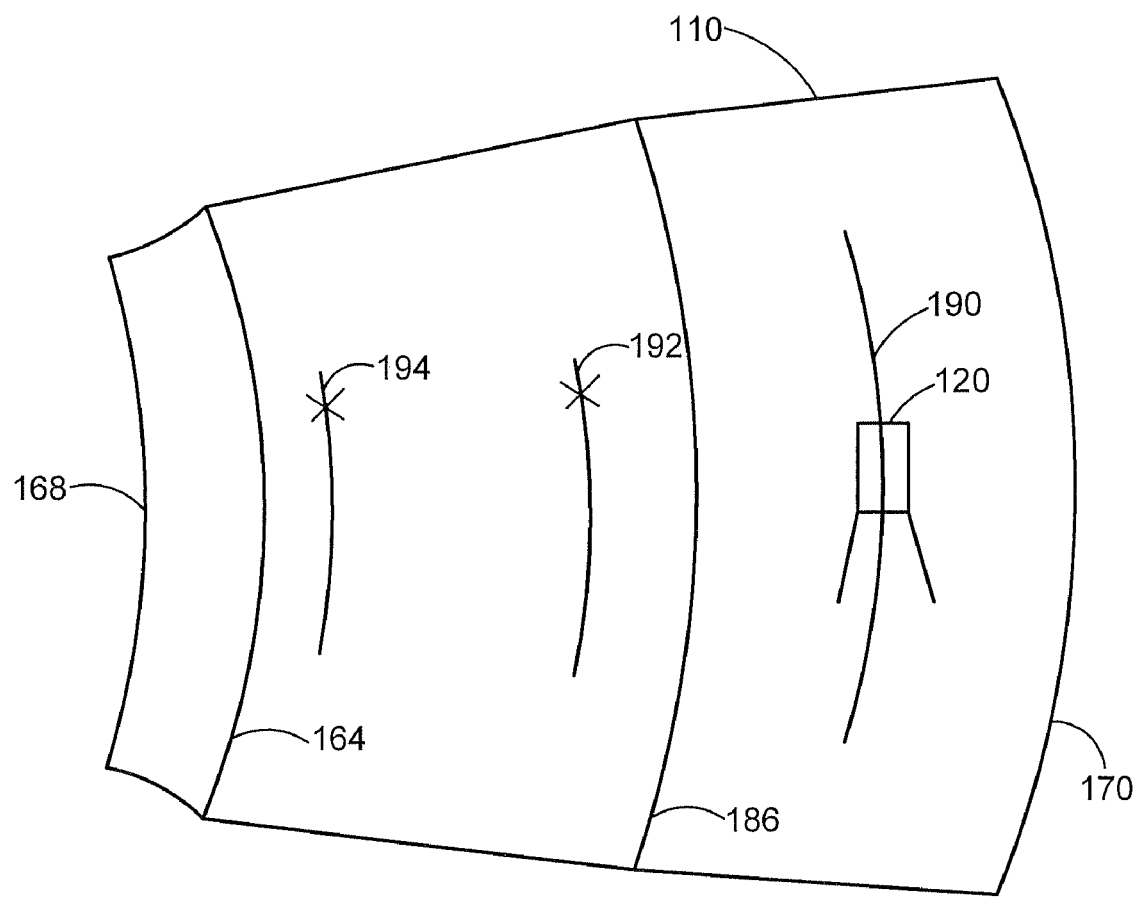
FIG. 9 is a view similar to FIG. 6 depicting two pending destination tracks in relation to the radially inward segment of the sweep routine.

Otherwise, if the system constraints demand that the sweep routine be performed during a time of heavy I/O activity, then the controller 148 can schedule it in accordance with pending seek commands in the command queue. For example, FIG. 9 depicts an illustrative scenario wherein the head 120 is presently located at track 190, with seek commands pending in the command queue for data stored in destination tracks 192 and 194 with respect to the first and second tracks 186, 164, respectively, of the inward segment of the bidirectional sweep routine. In this situation, the controller 148 will integrate the inward leg of the sweep routine as a constituent of the pending seek commands. For example, the controller 148 might seek to track 194 by accelerating the head 120 in accordance with the sweep routine velocity profile (FIG. 7) beginning at track 186. The controller 148 can complete the sweep routine to track 164 and then seek back to track 194, or alternatively it might interrupt the sweep routine to satisfy the command to track 194, then resume the sweep routine to track 164 idempotently. In other alternative embodiments the controller 148 can substitute track 194 for the second track of the sweep routine when the destination track is within a predefined distance from the second radial position of the sweep routine (track 164 in this case).

Returning to FIG. 8, once the sweep routine is scheduled in block 206 then the steps of the routine commence in block 208 where the controller 148 moves the transducer 120 to the first radial position 186 (FIG. 4). In block 210 the controller 148 accelerates the transducer 120 to the second radial position 164. The controller 148 then relocates the transducer 120 to the third radial position 188 in block 212. Finally, the controller 148 accelerates the transducer 120 to the fourth radial position 166 in block 214.

The controller 148 can interrupt any of the steps 208, 210, 212, 214 of the sweep routine to satisfy normal I/O demands in block 216. However, preferably the routine is resumed idempotently when the interruption is completed, as indicated by the double-directed arrows connecting block 216 with each of the four steps 208, 210, 212, 214 in the bidirectional sweep routine.

Generally, some embodiments as claimed contemplate a data storage device having a transducer operably disposed in a data transfer relationship with a storage medium, and means for removing debris from the medium by simultaneously executing data transfer commands and an idempotent sweeping routine with the transducer. For purposes of this description and meaning of the appended claims, the phrase "means for removing debris" only encompasses the structure disclosed herein and structural equivalents thereof that are capable of the efficiency and effectiveness with which debris can be swept from a storage medium as described herein.

For example, the disclosed structure includes the controller 148 executing programming instructions stored in memory to perform the steps of the method 200 of FIG. 8. Thus, the phrase "means for removing debris" expressly does not include previously attempted solutions that sweep all or part of the storage medium in only one direction, in that such solutions do not define the sweeping path in terms of the desired sidewall projections onto the medium to produce sidewall sweeping zones, and do not adaptively vary the head 120 velocity in relation to the desired magnitude of the sweeping zones to maximize sweep efficiency in both directions.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular starting positions and velocity profiles defining the sweep routine may vary depending on the particular configuration of the transducer without departing from the spirit and scope of the present invention.

What is claimed is:

1. A disc sweeping method comprising:
   rotating a data storage disc at a speed sufficient to generate a fluid flow that supports a transducer at a desired spatial separation from the data storage disc;
   during the rotating step, beginning a sweep routine of the transducer, along a sweep path and in accordance with a velocity profile that are both predefined before the beginning the sweep routine, by moving the transducer to a first track of the data storage disc that is predefined by the sweep path;

during the rotating step and after completing the moving the transducer to the first track step, accelerating the transducer from the first track radially inward to a second track of the data storage disc that is predefined by the sweep path, at an acceleration rate that is predefined by the velocity profile;

during the rotating step and after completing the accelerating the transducer from the first track step, moving the transducer to a third track of the data storage disc that is predefined by the sweep path, the third track being disposed neither radially between the first and second tracks nor consecutive to either of the first or second tracks; and during the rotating step and after completing the moving the transducer to the third track step, accelerating the transducer from the third track radially outward to a fourth track of the data storage disc that is predefined by the sweep path, at an acceleration rate that is predefined by the velocity profile, thereby ending the sweep routine.

2. The method of claim 1 wherein the accelerating steps comprise moving the transducer at constant accelerations.

3. The method of claim 1 wherein the accelerating steps comprise moving the transducer from the first to the second tracks at a first acceleration and moving the transducer from the third to the fourth tracks at a second acceleration different than the first acceleration.

4. The method of claim 1 wherein the accelerating steps comprise the transducer velocity being directly related to a transducer sidewall projection on the data storage disc corresponding to the transducer radial location.

5. The method of claim 1 wherein the first and third tracks define boundaries of an annular zone that includes a track with which the transducer is operably disposable at a substantially zero skew.

6. The method of claim 5 characterized by more than about five thousand tracks in the annular zone.

7. The method of claim 1 wherein the first and third tracks are predefined in terms of a desired magnitude of a sidewall projection of the transducer onto the data storage disc.

8. The method of claim 7 wherein the predefined sweep path is characterized by defining the first track in relation to a first sidewall projection and defining the third track in relation to a second sidewall projection different than the first sidewall projection.

9. The method of claim 1 wherein the second and fourth tracks are innermost and outermost data tracks, respectively.

10. The method of claim 1 implemented by a data storage device controller that also schedules pending data transfer input/output (I/O) commands with respect to associated destination tracks of the data storage disc.

11. The method of claim 10 wherein at least one of the accelerating steps comprises:
   interrupting the predefined transducer acceleration at the respective destination track to satisfy one of the pending I/O commands; and
   resuming the predefined transducer acceleration from the destination track when satisfying the data transfer I/O command is completed.

12. The method of claim 10 wherein at least one of the accelerating steps is at least partially commanded by the controller as a constituent of a seek command from a current track to the destination track.

13. The method of claim 10 wherein at least one of the accelerating steps is at least partially commanded by the controller to occur during a data storage device idle time.

14. The method of claim 10 wherein at least one of the accelerating steps is at least partially commanded by the controller to occur in conjunction with executing a data storage device reduced power state.

15. A controller that executes instructions stored in a computer readable memory for performing a bidirectional sweep routine that moves a transducer in accordance with a predefined velocity profile along a predefined sweep path adjacent a storage medium to remove debris from the medium, the bidirectional sweep routine characterized by moving the transducer radially inward along a first segment of the sweep path according to the predefined velocity profile, and moving the transducer radially outward along a second segment of the sweep path according to the predefined velocity profile, wherein the sweep path does not include an annular band of tracks between the first segment and the second segment, wherein any moving of the transducer in the annular band is not governed by the predefined velocity profile, and wherein the transducer is operably alignable at a zero skew angle with one of the tracks in the annular band.

16. The controller of claim 15 wherein the bidirectional sweep routing accelerates the transducer in accordance with the predefined velocity profile in each of the first and second segments.

17. The controller of claim 15 wherein the bidirectional sweep routine is a constituent in a seek command from a current position to a destination position associated with satisfying a pending data transfer I/O command with respect to the storage medium.

18. The controller of claim 15 capable of interrupting the bidirectional sweep routine to satisfy a pending data transfer I/O command and subsequently resuming the bidirectional sweep routine in accordance with the predefined velocity profile from where the interrupting occurred.

19. The controller of claim 15 wherein the bidirectional sweep routine begins at staffing positions of each segment that are associated with desired sidewall projections of the transducer onto the storage medium.

20. A data storage device comprising:
   a transducer operably disposed in a data transfer relationship with a storage medium; and
   means for removing debris from the medium that moves the transducer along a predefined bi-directional sweeping path and that satisfies a pending data transfer I/O command after the transducer has begun movement along the sweeping path but before the transducer has completed movement along the sweeping path.

* * * * *

UNITED STATES PATENT AND TRADEMARK OFFICE
CERTIFICATE OF CORRECTION

PATENT NO. : 7,561,367 B2  
APPLICATION NO. : 11/855489  
DATED : July 14, 2009  
INVENTOR(S) : Erhard Schreck Page 1 of 1

It is certified that error appears in the above-identified patent and that said Letters Patent is hereby corrected as shown below:

In Col. 10, line 46  
replace "begins at staffing"  
with "begins at starting."

Signed and Sealed this

Eighth Day of September, 2009

David J. Kappos  
*Director of the United States Patent and Trademark Office*